(12) United States Patent
Kloos

(10) Patent No.: US 9,994,205 B2
(45) Date of Patent: Jun. 12, 2018

(54) AXIS OF A LAND VEHICLE, LAND VEHICLE WITH SUCH A SUSPENSION AND DISK BRAKE AND BRAKE SUPPORT OF SUCH LAND VEHICLE

(71) Applicant: WABCO Europe BVBA, Brussels (BE)

(72) Inventor: Eugen Kloos, Viernheim (DE)

(73) Assignee: WABCO Europe BVBA, Brussels (BE)

( * ) Notice: Subject to any disclaimer, the term of this patent is extended or adjusted under 35 U.S.C. 154(b) by 66 days.

(21) Appl. No.: 15/057,465

(22) Filed: Mar. 1, 2016

(65) Prior Publication Data

US 2016/0258499 A1    Sep. 8, 2016

(30) Foreign Application Priority Data

Mar. 5, 2015    (DE) .................. 10 2015 002 892

(51) Int. Cl.
| | | |
|---|---|---|
| *B60T 1/06* | (2006.01) |
| *B60T 13/74* | (2006.01) |
| *F16D 66/00* | (2006.01) |
| *F16D 121/24* | (2012.01) |
| *F16D 125/36* | (2012.01) |
| *F16D 125/40* | (2012.01) |

(52) U.S. Cl.
CPC ........ *B60T 13/74* (2013.01); *F16D 2066/005* (2013.01); *F16D 2121/24* (2013.01); *F16D 2125/36* (2013.01); *F16D 2125/40* (2013.01)

(58) Field of Classification Search
CPC ............... F16D 65/0056; F16D 55/225; F16D 2055/0008; F16D 2069/0433; F16D 2065/134; F16D 2065/1356; F16D 2066/005; F16D 2121/24; F16D 2125/36; F16D 2125/40; B60T 13/74
USPC ................ 188/18 A, 71.1, 72.1, 73.1, 73.39; 301/35.621, 132
See application file for complete search history.

(56) References Cited

U.S. PATENT DOCUMENTS

| 4,360,079 A * | 11/1982 | Belart .................. F16D 55/226 188/73.34 |
| 7,407,045 B2 | 8/2008 | Hofmann et al. |
| 7,431,132 B2 * | 10/2008 | Schog .................. F16D 65/092 188/73.39 |

(Continued)

FOREIGN PATENT DOCUMENTS

| DE | 10 2004 033 826 A1 | 2/2006 |
| DE | 10 2009 015 940 A1 | 10/2010 |

(Continued)

OTHER PUBLICATIONS

Translation of WO 2011/161352 obtained Sep. 11, 2017 from https://worldwide.espacenet.com/.*

*Primary Examiner* — Pamela Rodriguez
(74) *Attorney, Agent, or Firm* — Brinks Gilson & Lione

(57) ABSTRACT

A land vehicle with a disk brake, in particular a utility vehicle with a disk brake, has an axle with a first and a second flange surface for flanging a brake carrier of the disk brake. A first through-opening opens into the first flange surface and a second through-opening opens into the second flange surface. The first through-opening in a first region has a smaller clearance width than in a second region. The first region is located closer to the first flange surface than the second region.

18 Claims, 6 Drawing Sheets

(56) References Cited

U.S. PATENT DOCUMENTS

| | | | |
|---|---|---|---|
| 9,447,829 B2 * | 9/2016 | Bull | F16D 65/095 |
| 2002/0007989 A1 * | 1/2002 | Matsuishi | B60T 1/065 |
| | | | 188/73.39 |
| 2008/0135352 A1 | 6/2008 | Bell | |
| 2014/0027214 A1 | 1/2014 | Morris et al. | |

FOREIGN PATENT DOCUMENTS

| | | |
|---|---|---|
| FR | 2 976 038 A1 | 12/2012 |
| WO | 94/18470 A1 | 8/1994 |
| WO | WO -2011/161352 A1 * | 12/2011 |

\* cited by examiner

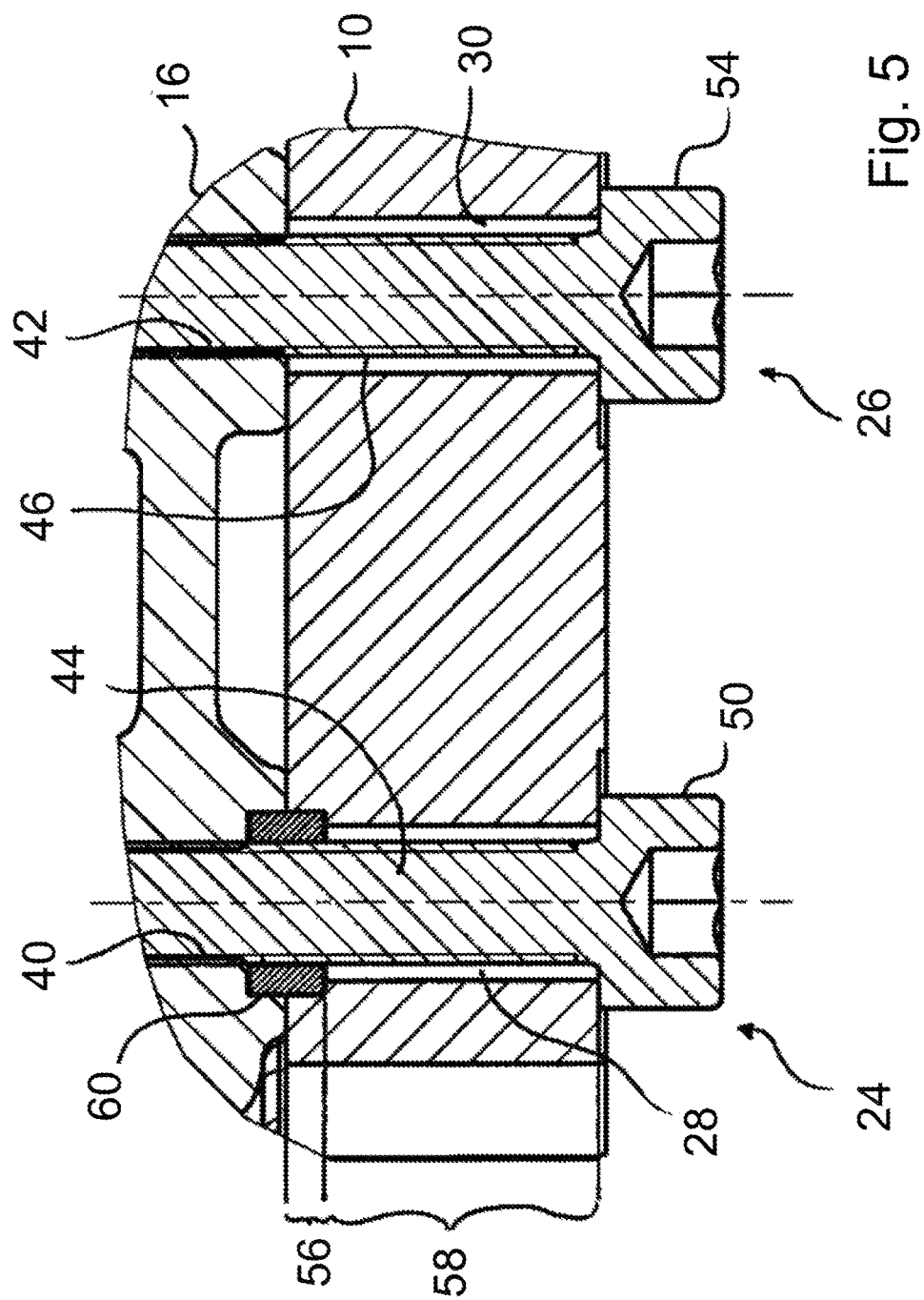

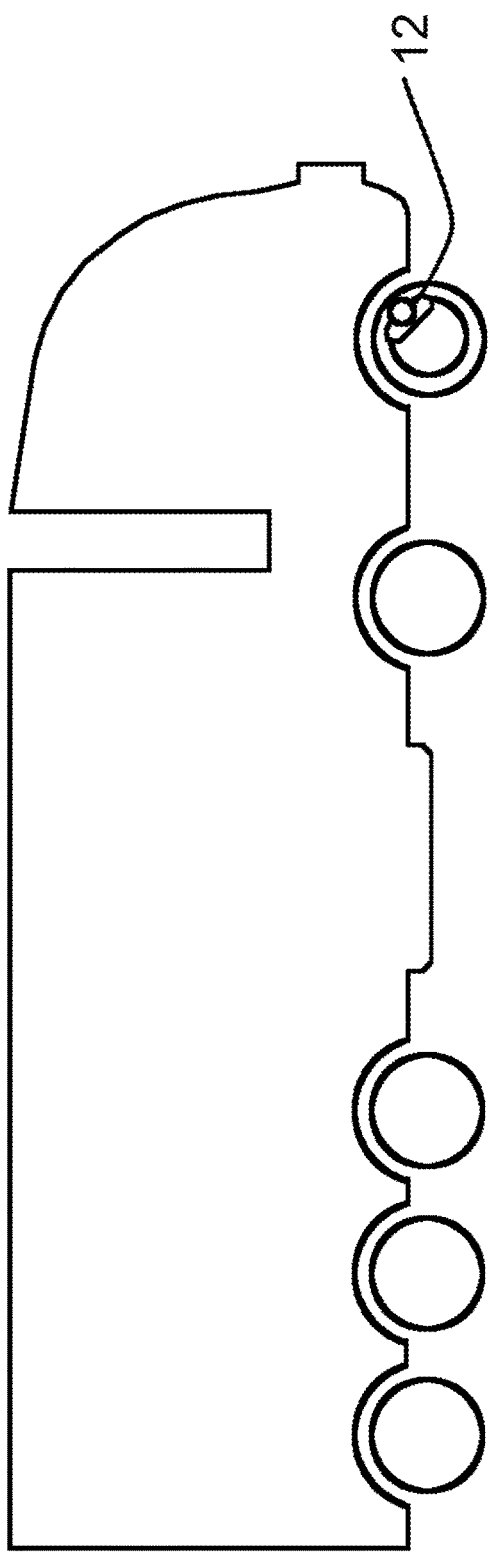

AXIS OF A LAND VEHICLE, LAND VEHICLE WITH SUCH A SUSPENSION AND DISK BRAKE AND BRAKE SUPPORT OF SUCH LAND VEHICLE

TECHNICAL FIELD

The invention relates to an axle of a land vehicle, in particular a utility vehicle, having a disk brake, comprising a first and a second flange surface for flanging a brake carrier of the disk brake, a first through-opening which opens into the first flange surface and a second through-opening which opens into the second flange surface.

BACKGROUND

Axles of the type mentioned in the introduction are known. In this case, the first through-opening serves for forming an interference fit. To this end, a screw is inserted into the first through-opening for fastening the brake carrier to the axle, said screw fitting very tightly in the first through-opening, i.e. it is retained therein with minimal clearance. In contrast, the second through-opening is configured as a clearance fit. It serves for receiving a screw which also serves for fastening the brake carrier to the land vehicle, but this further screw is retained with clearance in the second through-opening. This clearance fit serves to avoid jamming during the mounting and/or dismantling of the brake carrier on the land vehicle, as unavoidable dimensional tolerances are compensated by the clearance fit. In contrast, the interference fit serves for the reliable positioning of the brake carrier on the land vehicle.

In addition to the second through-opening which serves as a connection with a clearance fit, further through-openings may be provided which also serve for the clearance fit.

In particular, during a braking procedure and in journeys on poor road surfaces, in particular transverse forces act on the connection of the brake carrier to the land vehicle and/or the axle thereof, i.e. forces which in each case act transversely to the longitudinal axis of the through-openings. These transverse forces may, in particular in the case of the screw which extends through the first through-opening, result in the screw head moving transversely to the longitudinal axis of the first through-opening, overcoming frictional forces. As a result, the screw may be released.

Brakes are known in which this problem is countered by the relevant through-openings and screws having larger dimensions than is actually required with regard to the maximum tensile forces acting on the screws. Such a larger dimensioning has drawbacks, however, in particular as regards material consumption and use of constructional space.

SUMMARY

The object of one aspect of the invention is to improve the axle of the type mentioned in the introduction such that an inadvertent release of the screw extending through the first through-opening is prevented without it having to have excessively large dimensions.

According to this aspect, the object set forth is achieved in that the first through-opening in a first region has a smaller clearance width than in a second region, wherein the first region is located closer to the first flange surface than the second region.

When a through-opening has been discussed above, in each case this is understood as the part of a bore which receives the shank of the screw used when flanging. In other words, viewed in the axial direction, it is that region which is located between the flange surface and the surface against which the screw head bears. Any continuation of the bore beyond the aforementioned support surface, for example for forming a flat surface, is not included in the through-opening.

In particular, when a screw is used in the first through-opening as a first screw which is designed to be cylindrical (thread-free) in the axial region, which in the mounted state is located inside the first through-opening, the transverse forces described above only act in the first region but not in the second region as here a greater clearance is present. As the first region is located closer to the first flange surface than the second region, the lever arm, by which the transverse forces act on the first screw, is shortened by the length of the second region, which is why the risk of transverse displacement of the screw head and thus a release of the screw head is considerably reduced.

In other words, the greater clearance width in the second region ensures the clearance of the first screw inside the first through-opening and thus less negative impact by transverse forces.

As this clearance in the second region is achieved by the design of the first through-opening, no measures have to be taken relative thereto on the first screw. Therefore, standard screws may be used, whereas in conventional brakes, fitting screws, which are substantially more complex to produce and therefore more expensive, are frequently used.

The second through-opening and optionally further through-openings with the same function may be designed, for example, to be cylindrical. In particular, the through-openings may be dimensioned such that the same screws may be used both in the first through-opening and in the second through-opening and optionally further through-openings may be used. As a result, confusion during mounting may be excluded. Such confusion has occurred repeatedly when the screws, namely fitting screws, used for the interference fit are different from those used for the clearance fit(s). This elimination of confusion is due to the difference between the interference fit and the clearance fit, or the clearance fits, on the particular embodiment of the first through-opening and is not due to any particular design of the screws.

The respective axial lengths of the first and second regions have to be adapted to the respective conditions of the brake. Within the scope of the invention, however, the ratio of the axial length of the second region to the axial length of the first region may be at least 1:1, preferably at least 2:1, further preferably at least 4:1.

Also, the clearance width of the first region and the clearance width of the second region are able to be selected appropriately so as to correspond to the respective conditions. According to the invention, in this case it may be provided that the clearance width of the first region is 0.30 mm to 2.8 mm smaller than the clearance width of the second region, preferably by 0.40 mm to 0.55 mm, further preferably by 0.45 mm to 0.55 mm.

The first through-opening with the two regions of different clearance widths may be produced by using a stepped tool. In this regard, the first region thus represents a fitting bore.

According to a preferred embodiment of the invention, however, a sleeve is used for reducing the clearance width inside the first region in comparison with the second region. In other words, a bore which may be cylindrical but does not have to be is incorporated therein, and a sleeve with an axial length corresponding to the axial length of the first region is inserted into the bore. The sleeve then represents a fitting sleeve. To this end, its internal diameter may be correspondingly adapted to the external diameter of the first screw used in the first through-opening.

In addition to the above axle, the invention also provides a land vehicle comprising a disk brake and such an axle, wherein the brake carrier of the disk brake has a third and a fourth flange surface for flanging to the axle as well as a third opening which opens into the third flange surface with an internal thread and a fourth opening which opens into the fourth flange surface with an internal thread, a first screw which in the mounted state extends through the first through-opening into the third opening, and a second screw which in the mounted state extends through the second through-opening into the fourth opening.

The third and fourth openings are generally blind holes, the screws extending through the respective through-opening on the brake carrier being screwed therein for fastening the brake carrier to the axle. However, there may also be through-openings.

As already mentioned above, according to the invention it is particularly preferred that the first and the second screws are the same. As a result, confusion during mounting is avoided. This is possible as the axle is designed in the manner described above in detail, so that even when the same screws are used, in one case an interference fit is produced and in another case a clearance fit is produced.

The third and fourth openings may together with the associated screws in each case form a clearance fit. According to a further preferred embodiment of the invention, however, the third opening in a first region has a smaller clearance width than in a second region, wherein the first region is located closer to the third flange surface than the second region.

As a result, the interference fit formed by means of the first region of the first through-opening is axially lengthened.

In turn, according to the invention the ratio of the axial length of the second region to the axial length of the first region is at least 1:1, preferably at least 2:1, further preferably at least 4:1.

The clearance width of the first region of the third opening according to the invention may be 0.30 mm to 2.8 mm smaller than the clearance width of the second region of the third opening, preferably by 0.40 mm to 0.55 mm, further preferably by 0.45 mm to 0.55 mm.

Finally, in connection with the third opening a sleeve may also be used in order to adjust the clearance width of the first region as described above.

Also, a single (common) sleeve may be used instead of two sleeves for reducing the clearance width both in the first through-opening and in the third opening.

Finally the invention also provides a disk brake and a brake carrier of the land vehicle described above.

The invention is described more clearly hereinafter with further details by means of preferred exemplary embodiments with reference to the accompanying drawings.

BRIEF DESCRIPTION OF THE DRAWINGS

In the drawings:

FIG. 5 shows a further view corresponding to FIG. 3, but of a further exemplary embodiment of the invention, and FIG. 6 schematically shows a land vehicle having a disk brake according to the invention.

DETAILED DESCRIPTION OF THE DRAWINGS

Figure 1:
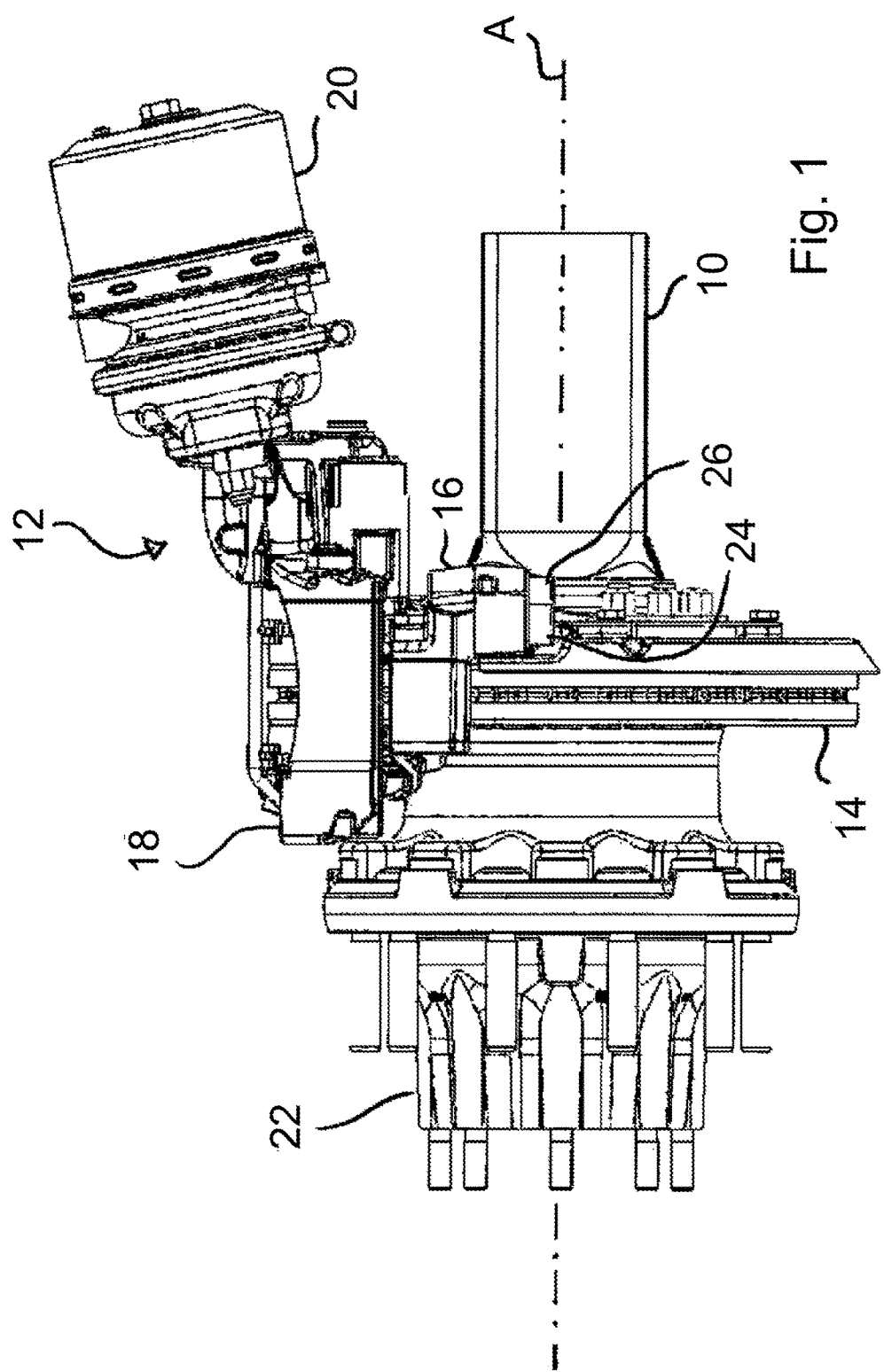
FIG. 1 shows schematically a partial view of a land vehicle, namely in particular an axle and a disk brake attached thereto according to an exemplary embodiment of the invention.

FIG. 1 shows an axle 10 which is part of a land vehicle. The axle 10 may be in one piece. It may also, however, have an adapter which here is regarded, however, as part of the axle 10. A disk brake 12 is flanged to the axle 10. The brake disk of the disk brake 12 is denoted by the reference numeral 14. A brake carrier 16, a brake caliper 18 and an actuating cylinder 20 form part of the brake 12. In the exemplary embodiment shown, the actuating cylinder 20 operates pneumatically. To the left in FIG. 1, an axle neck 22 is shown, a wheel (not shown) being able to be mounted thereon. A common rotational axis of the axle neck 22 and the brake 12 is denoted by the letter A.

A so-called radial screw connection serves for fastening the brake 12 to the axle 10. In this case, the relevant screws do not extend radially from the rotational axis A with mathematical precision. The axis thereof, however, is located perpendicular to the rotational axis A in FIG. 1. A first and a second screw are denoted in FIG. 1 by the reference numerals 24 and/or 26. In the preferred rotational direction of the brake disk 14, the first and second screws 24 and 26 are located on the disk entry side.

Figure 2:
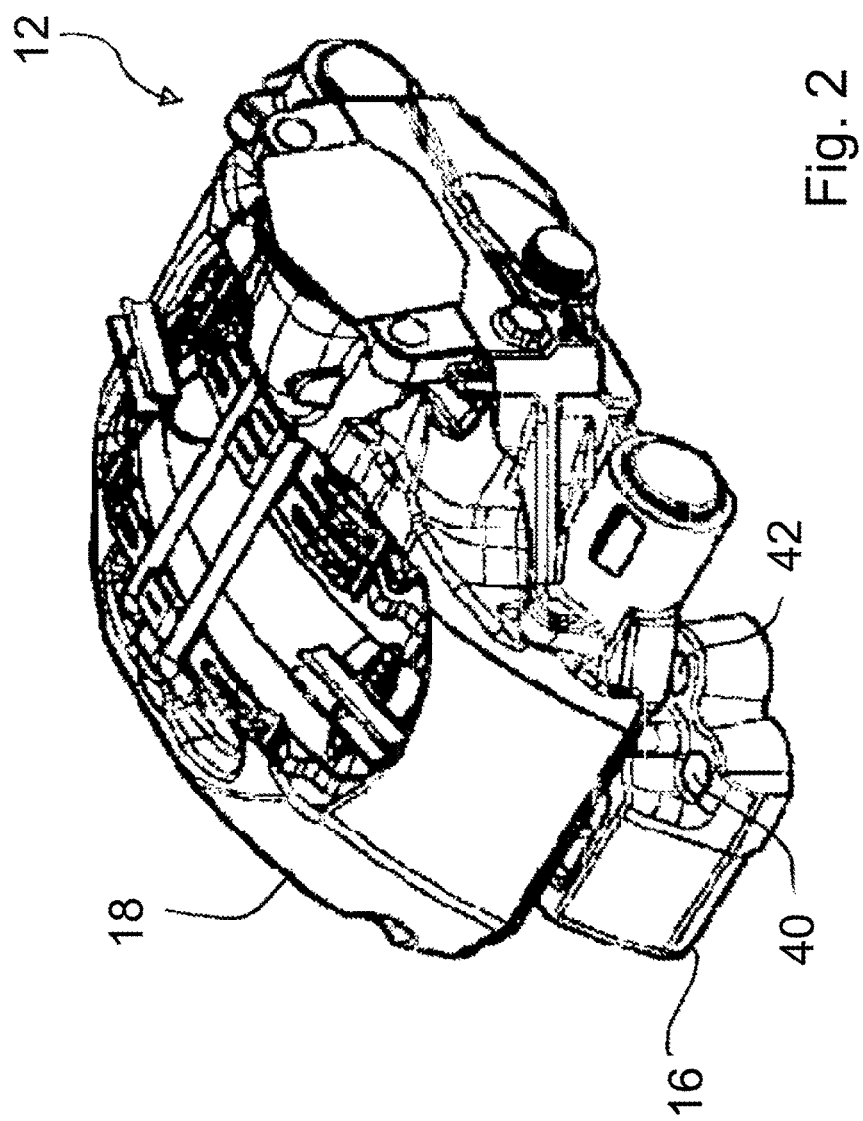
FIG. 2 shows a schematic perspective view of the disk brake according to FIG. 1.

FIG. 2 shows a schematic perspective view of the brake 12.

Figure 3:
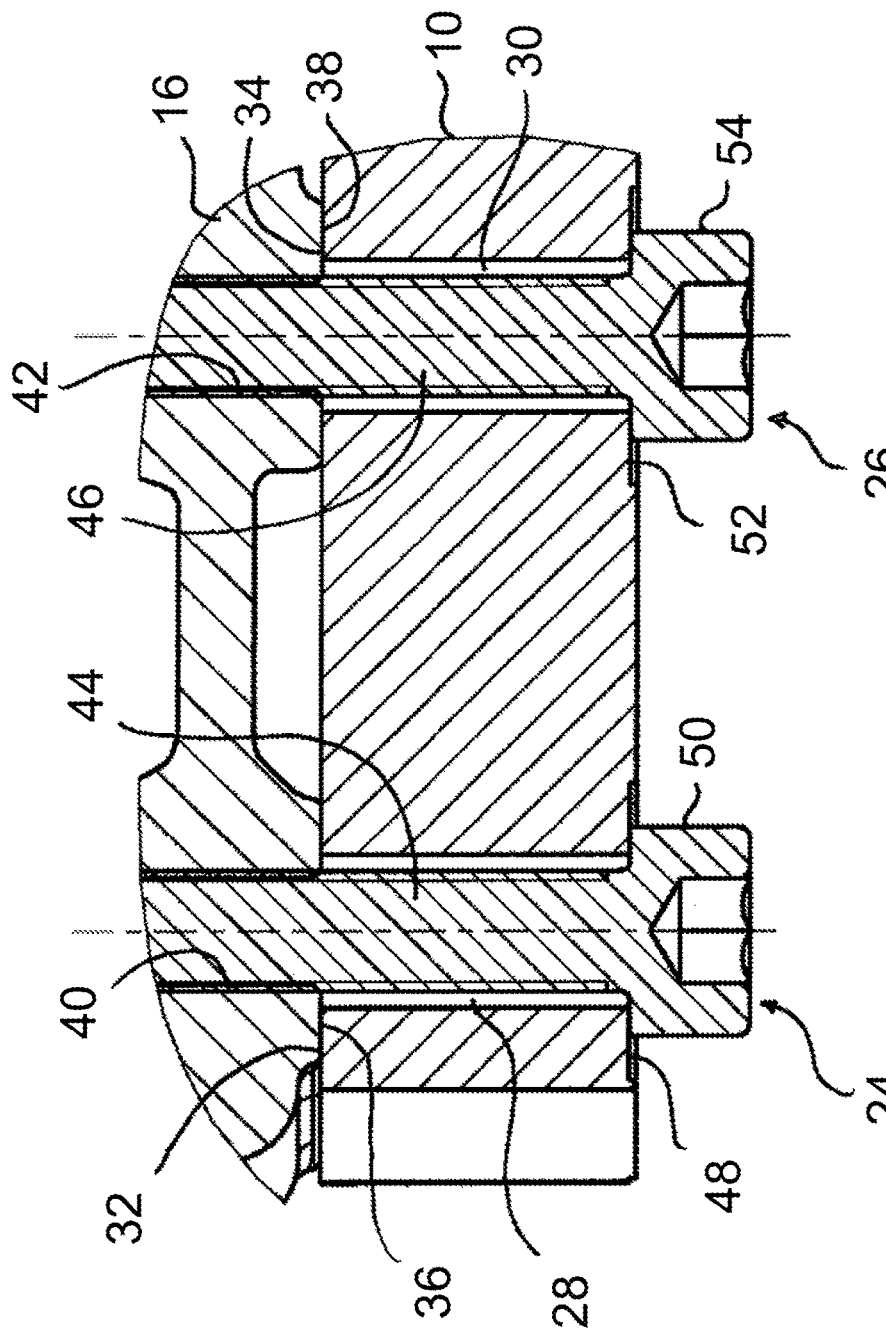
FIG. 3 shows a sectional partial view of an axle with a brake carrier attached thereto according to the prior art.

FIG. 3 shows a sectional partial view of the region with the first and second screws 24 and 26 of FIG. 1. In this case, the sectional view is the prior art.

Accordingly, the axle 10 has a first and a second through-opening 28 and/or 30, which in each case open into a first and/or second flange surface 32 and/or 34. In the exemplary embodiment shown, the first and second flange surfaces 32 and 34 are aligned with one another, which is why they form a single surface connected together. However, they may also be separated from one another. By the use of the first and second flange surfaces 32 and 34, the brake carrier 16 is flanged to the axle 10. Additionally, in turn it has a third and fourth flange surface 36 and/or 38. In the flanged state the third flange surface 36 bears against the first flange surface 32, and the fourth flange surface 38 bears against the second flange surface 34.

The brake carrier 16 has a third and a fourth opening 40 and/or 42 which are threaded bores and which, when said brake carrier is flanged to the axle 10, are aligned with the first and/or second through-opening 28 and/or 30.

The first screw 24 extends through the first through-opening 28 into the third opening 40. The second screw 26 extends through the second through-opening 30 into the fourth opening 42. If the first and second screws 24, 26 are tightened, the brake carrier 16 and thus the brake 12 are fastened to the axle 10 by being flanged thereon.

When the first and second through-openings 28 and 30 have been discussed above, in each case an opening through which the shank 44 of the first screw 24 and/or the shank 46 of the second screw 26 extends is understood thereby. The opening extends from the first flange surface 32 to a surface 48 on which the head 50 of the first screw 24 is supported and/or from the second flange surface 34 to a surface 52 against which the head 54 of the second screw 26 is supported.

In FIG. 3, only two of a plurality of screws are shown for attaching the brake 12 to the axle 10. Reference is expressly made to the fact that these two screws are not the only fastening devices. However, generally more than two screws are provided, in the exemplary embodiment shown in FIG. 3 there are four screws. In the known solutions, one of these four screws is configured as a fitting screw in order to ensure secure positioning of the brake 12 on the axle 10. All other screws and, in particular, the first and second screws 24 and 26 are clearance screws. As may be derived, in particular, from FIG. 3, the first and second screws 24 and 26 extend with clearance into the first and/or second through-opening 28 and/or 30.

The invention is based on the aforementioned fitting screw in that it is made superfluous. To this end, two different solutions are shown in FIGS. 4 and 5.

Figure 4:
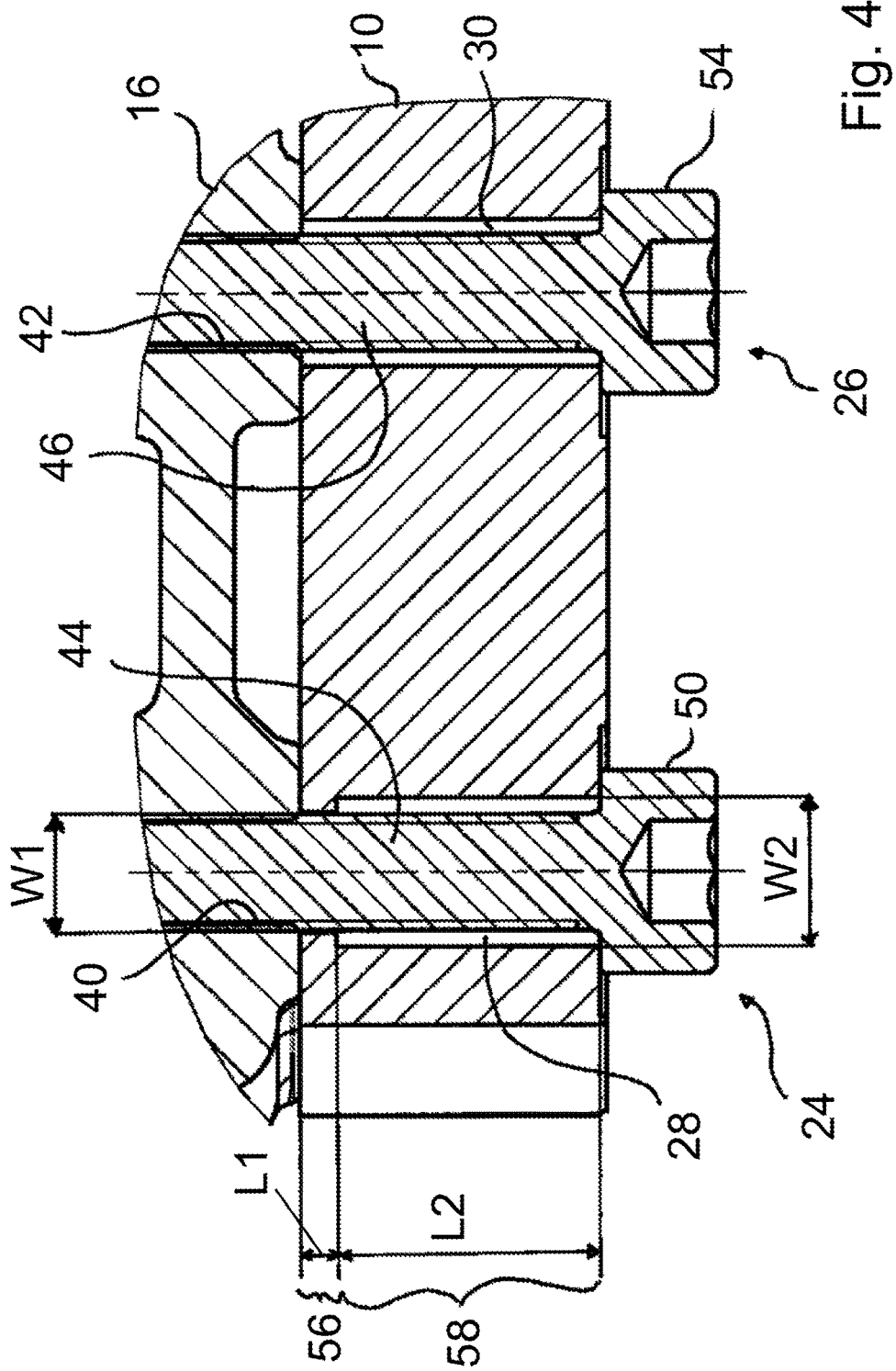
FIG. 4 shows a view corresponding to FIG. 3, but of a first exemplary embodiment of the invention.

According to FIG. 4 the clearance width of the first through-opening 28 is smaller in a first region 56 than in a second region 58. The ratio of the length L2 of the second region 58 to the length L1 of the first region 56 in the exemplary embodiment shown is 7.6. The clearance width W2 of the second region 58 is smaller by 0.5 mm than the clearance width W1 of the first region 56.

The clearance width W1 of the first region 56 is adapted to the diameter of the first screw 24, such that an interference fit is formed between the first screw 24 and the first through-opening 28 in the first region 56, whereby the brake carrier 16 and thus the brake 12 are centered relative to the axle 10. As a result, the fitting screw known from the prior art is not required.

The second screw 26 with the associated second through-opening 38, however, together form a clearance fit as in the known brakes.

The solution according to FIG. 5 differs from that according to FIG. 4 only in that the difference in the clearance width of the through-opening 28 is not (solely) achieved by the geometry thereof but by a sleeve 60 which serves therefore as a fitting sleeve. The size ratios with regard to the clearance widths W1 and W2 and the axial lengths L1 and L2 are the same as in the solution according to FIG. 4, which is why this is not explained again.

In the exemplary embodiment according to FIG. 5, the sleeve 60 is not only located inside the first through-opening 28 but extends as far as the third opening 40 in the brake carrier 16. As a result, it is retained securely in both axial directions.

The features of the invention disclosed in the above description, the claims and the drawings may be essential both individually and in any combinations for implementing the invention in the various embodiments thereof.

While the above description constitutes the preferred embodiments of the present invention, it will be appreciated that the invention is susceptible to modification, variation and change without departing from the proper scope and fair meaning of the accompanying claims.

What is claimed is:

1. An axle of a land vehicle having a disk brake (12), the axle comprising
    a first flange surface (32) and a second flange surface (34), for flanging a brake carrier (16) of the disk brake,
    a first through-opening (28) which opens into the first flange surface and
    a second through-opening (30) which opens into the second flange surface,
    wherein the first through-opening (28) in a first region (56) has a smaller first clearance width (W1) than a second clearance width (W2) in a second region (58), wherein the first region is located closer to the first flange surface (32) than the second region.

2. The axle as claimed in claim 1, wherein the first region has a first axial length (L1) and the second region has a second axial length (L2), the second axial length (L2) and the first axial length (L1) having a length ratio of the second axial length (L2) to the first axial length (L1) of at least 1:1.

3. The axle as claimed in claim 2, wherein the length ratio is at least 2:1.

4. The axle as claimed in claim 3, wherein the length ratio is at least 4:1.

5. The axle as claimed in claim 1, wherein the first clearance width (W1) of the first region (56) is 0.30 mm to 2.8 mm smaller than the second clearance width (W2) of the second region (58).

6. The axle as claimed in claim 5, wherein the first clearance width (W1) of the first region (56) is 0.40 mm to 0.55 mm smaller than the second clearance width (W2) of the second region (58).

7. The axle as claimed in claim 6, wherein the first clearance width (W1) of the first region (56) is 0.45 mm to 0.55 mm smaller than the second clearance width (W2) of the second region (58).

8. The axle as claimed in claim 1, further comprising a sleeve (60) in the first region (56).

9. A land vehicle comprising
    an axle (10) having
        a first and a second flange surface (32, 34) for flanging a brake carrier (16) of a disk brake,
        a first through-opening (28) which opens into the first flange surface and
        a second through-opening (30) which opens into the second flange surface,
        wherein the first through-opening (28) in a first region (56) has a smaller first clearance width (W1) than a second clearance width (W2) in a second region (58) for the first through-opening (28), wherein the first region is located closer to the first flange surface (32) than the second region;
    the disk brake (12) having the brake carrier (16), the brake carrier (16) of the disk brake having
        a third flange surface (36) and a fourth flange surface (38) for flanging to the axle,
        a third opening (40) which opens into the third flange surface (36) with an internal thread, and
        a fourth opening (42) which opens into the fourth flange surface (38) with an internal thread,
    a first screw (24) which in the mounted state extends through the first through-opening (28) into the third opening (40), and
    a second screw (26) which in a mounted state extends through the second through-opening (30) into the fourth opening (42).

10. The land vehicle as claimed in claim 9, wherein the first screw (24) and the second screw (26) are identical.

11. The land vehicle as claimed in claim 9, wherein the third opening (40) in a first region has a smaller clearance width than in a second region, wherein the first region is located closer to the third flange surface (36) than the second region.

12. The land vehicle as claimed in claim 11, wherein the first region has a first axial length (L1) and the second region has a second axial length (L2), the second axial length (L2) and the first axial length (L1) having a length ratio of the second axial length (L2) to the first axial length (L1) of at least 1:1.

13. The land vehicle as claimed in claim 12, wherein the length ratio is at least 2:1.

14. The land vehicle as claimed in claim 13, wherein the length ratio is at least 4:1.

15. The land vehicle as claimed in claim 11, wherein the first clearance width (W1) of the first region (56) is 0.30 mm to 2.8 mm smaller than the second clearance width (W2) of the second region (58).

16. The land vehicle as claimed in claim 15, wherein the first clearance width (W1) of the first region (56) is 0.40 mm to 0.55 mm smaller than the second clearance width (W2) of the second region (58).

17. The land vehicle as claimed in claim 16, wherein the first clearance width (W1) of the first region (56) is 0.45 mm to 0.55 mm smaller than the second clearance width (W2) of the second region (58).

18. The land vehicle as claimed in claim 11, further comprising a sleeve in the first region.

\* \* \* \* \*